Jan. 5, 1965     G. M. GRADY     3,164,229

NON-BUCKLING MOLDING STRUCTURE

Filed June 14, 1962

INVENTOR.
GEORGE M. GRADY
BY Jack M. Young
ATTORNEY 3,164,229
NON-BUCKLING MOLDING STRUCTURE
George M. Grady, Minneapolis, Minn., assignor to Hupp Corporation, Cleveland, Ohio, a corporation of Virginia
Filed June 14, 1962, Ser. No. 202,629
3 Claims. (Cl. 189—78)

The present invention relates to a non-buckling construction wherein a molding, channel, tubular member, or similar member is secured to a base surface.

An object of the present invention is to provide such construction in one of the rail members of a metal window, such as in the movable glass stop thereof.

In the past, it has been usual to secure this glass stop to the base of the window sash rail by a screw extending therethrough. However, this glass stop, formed of channel shape, is generally thin; and this movable glass stop member is thus frequently bowed inwardly by the securing screw so that the polished surface of the metal thereof has a non-uniform light reflection thereat.

With the foregoing in view, a further object of the present invention is to provide a construction for a movable glass stop member wherein the fastener firmly secures said member to the base surface of the sash rail without substantially defecting any wall thereof exposed to view.

A further object to the present invention is to provide an assembly for joining a movable glass stop member, a sheet member formed into a channel such as C-shape in cross section, a member having a recess therein, a member at least partially tubular in cross section, or any other similar member to a base surface without substantially deflecting any exterior surface thereof.

A further object of the present invention is to provide a construction characterized by its strong and sturdy nature, compactness, structural simplicity, minimum number of component parts, inexpensive manufacturing cost, ease of assembly and attractive exterior appearance.

These and other objects of the present invention will become more fully apparent by reference to the appended claims as the following detailed description proceeds by reference to the accompanying drawing wherein:

Figure 1:
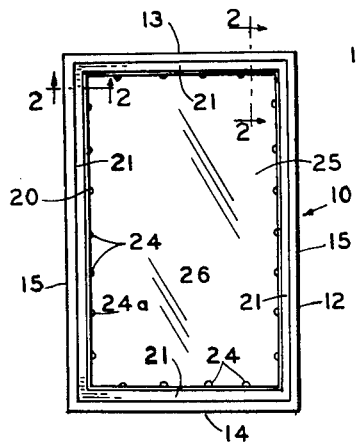
FIGURE 1 is a front view of the inside of a window construction.

While this invention might be adapted to various types of uses, it has been chosen to show the same as applied to a metal window 10 in FIG. 1, such as a stainless steel, reversible window having its sash swingable about a vertical central axis in its frame. However, it should be readily apparent that this invention may be used for other type window constructions, such as top-hinged in-swinging, projected-fixed-hopper, folding, single-hung, double-hung, fixed sash, casement, etc., windows.

Figure 2:
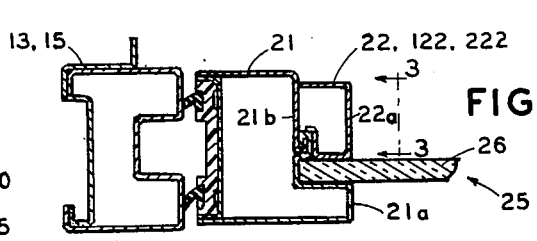
FIGURE 2 is a sectional view taken generally along either line 2—2 in FIG. 1.
Figure 3:
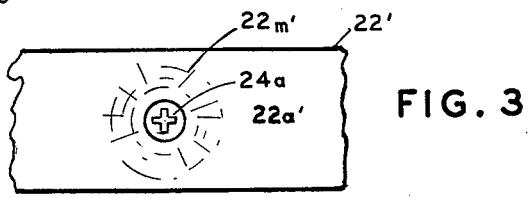
FIGURE 3 is a view taken generally along the line 3—3 in FIG. 2 but showing a prior art form of construction.
Figure 5:
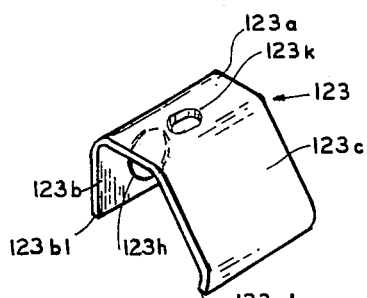
FIGURE 5 is a perspective view of the retainer clip shown in FIG. 4.
Figure 4:
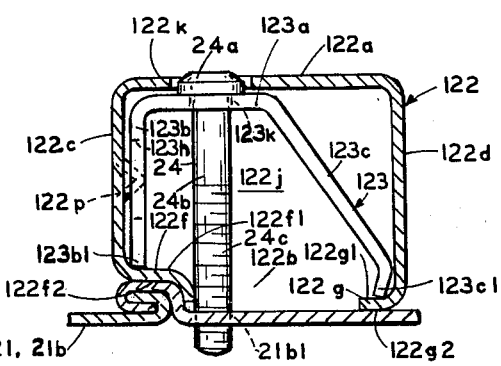
FIGURE 4 is an enlarged sectional view of a first form of the invention with a retainer clip added in FIG. 2 and with the view taken from the opposite direction than FIG. 2.
Figure 6:
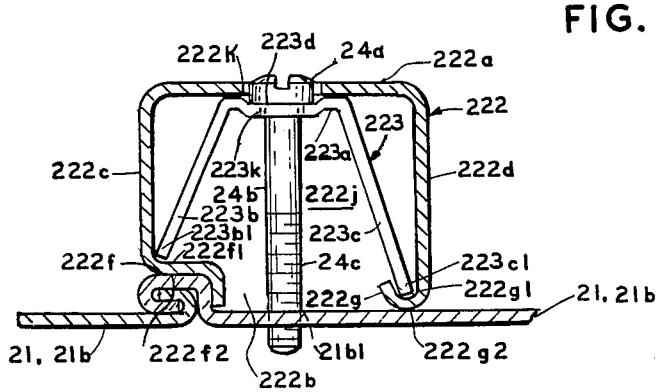
FIGURE 6 is a sectional view, similar to FIG. 4, but of a second form of the invention.

The construction in FIGS. 1 and 2 is a generic showing of the prior art construction in FIG. 3, of the first form of this invention in FIGS. 4 and 5, and of the second form of this invention in FIG. 6.

Window 10 in FIG. 1 includes frame 12 comprising interconnected head member 13, sill member 14, and two jamb members 15. Window 10 has a sash 20 mounted for swinging by a central vertical axis in frame 12. This sash 20 includes a plurality of rails or framing elements 21 interconnected to form a frame having an opening adapted to contain a glass pane unit 26. Sash 20 includes top, bottom and two parallel side rails 21 thus connected together. Each rail 21 is formed with a fixed glass stop 21a contiguous to one end of a base surface 21b and forms one of the four sides of framed opening 25 containing glass pane unit 26. Each rail 21 has a removable glass stop or member 22 (generically shown in FIGS. 1 and 2), 22', 122 or 222 secured by one or more suitable fasteners 24, such as screws, to base surface 21b of rail 21 so as to hold glass pane unit 26 positioned between glass stops 21a and 22, 22', 122 or 222.

The present invention is especially concerned with securing to base surface 21b in any suitable metal window 10 a movable glass stop formed as a thin, highly polished metal member.

FIGURE 3 illustrates the defect commonly occurring in prior art constructions. Here prior art glass stop 22' is secured directly to a base surface by a downward force exerted by head 24a of a fastener. Since top surface 22a' of this prior art glass stop 22' is thin, screw head 24a bows the metal concavely inwardly to form a downwardly extending dimple 22m' in surface 22a'. Since surface 22a' is highly polished, this dimple 22m' will change the light reflection characteristic on this surface 22a' so that concave dimple 22m' will be readily apparent on the exterior appearance of the window sash to anyone looking thereat. This problem is especially prevalent either if this screw is over tightened or if this screw must be screwed in fairly tightly in order to securely fasten glass stop 22'.

The present invention is directed to providing a means for securely fastening a movable glass stop member, such as member 122 or 222 in FIGS. 4–6, to base surface 21b without concavely defecting the exterior surface 122a or 222a of said member by the fastening means, such as shown by dimple 22m' in FIG. 3, even though this portion of this member is thin enough to be readily deflectable by force exerted thereon by a fastener securing it to the base surface.

Now the first form in FIGS. 4 and 5 will be described.

In FIG. 4, movable glass stop or member 122 is a sheet member formed into the shape of a channel 122j at least generally C-shaped in cross section and adapted to have its open side 122b pulled against base surface 21b by one or more screws 24. This C-shape of member 122 includes in cross section in FIG. 4 first leg 122c and second leg 122d connected respectively to opposite ends of third leg 122a, and includes fourth leg 122f and fifth leg 122g connected respectively to said first and second legs remote from third leg 122a. Legs 122f and 122g provide spaced apart portions straddling open side 122b, and respectively having inner surfaces 122f1 and 122g1 forming portions of the inner surface of channel 122j and having outer surfaces 122f2 and 122g2 adapted to bear against and to be pulled down against base surface 21b in the manner shown.

Glass stop 122 is secured in position on base surface 21b with the help of retainer clip 123. This clip 123 may be made of any suitable material, but preferably of metal; is of generally inverted U-shape, comprising a base or cross bar 123a and two legs 123b and 123c; is located within channel 122j; and has on the distal ends of the legs 123b and 123c respectively retainer portions 123b1 and 123c1 bearing against surfaces 122f1 and 122g1 remote from base surface 21b.

Each movable glass stop 122 is secured to its associated base surface 21b by a threaded fastener 24 including interconnected head 24a and shank 24b having threads 24c. Aligned holes are provided for said fastener, including hole 122k in third leg 122a of member 122; hole 123k in U-shape base or cross bar 123a of retainer clip 123; and hole, channel open side, or opening 122b. Hole 122k has a cross sectional area greater than fastener head 24a so that this head 24a can freely pass therethrough. Fastener 24 extends through aligned hole 122k, 123k, 122b and 21b1, has head 24a located in hole 122k contiguous to third leg 122a, has shank 24b extending through hole 123k, and has threads 24c on shank 24b threaded into threaded hole 21b1, and firmly secured, in base surface 21b contiguous to hole 122b. Heads 24a of fasteners 24 extend out of holes 122k and above the exterior surface on leg 122a on glass stop 122 so as to be located within opening 25 framing glass 26 wherein this framing is formed by the third leg 122a of each of the four members 122 surrounding opening 25.

Hole 123k, as shown in FIG. 5, is elongated along the axis of channel 122j so as to permit fastener 24 to be inserted through holes 122k and 123k even though there may be axial misalignment of these holes in retainer clip 123 and member 122 along the length of channel 122j after assembly of retainer clip 123 in channel 122j.

Driving fastener 24 by screwing its threads 24c into threaded hole 21b1, secures its movable glass stop member 122 against base surface 21b by having fourth and fifth legs 122f and 122g pushed against base surface 21b by the retainer portions or distal ends 123b1 and 123c1 respectively on legs 123b and 123c of retainer clip 123. Thus, fastener head 24a does not inwardly bow third leg 122a by the securement force because the full fastening force exerted by fastener head 24a is carried by retainer clip 123, instead of by third leg 122a, and the securing forces are exerted on member 122 directly downwardly in FIG. 4 by retainer portions 123b1 and 123c1.

Hence, the outer or top surface of third leg 122a is substantially planar. If it is highly polished, light reflection will be generally uniform over the whole outer surface of legs 122a because each screw 24 securely holds its movable glass stop member 122 to base surface 21b without substantially deflecting any of the walls 122a, 122c or 122d of member 122 and without concavely deflecting surface 122a into a dimple, as shown by dimple 22m' in FIG. 3.

Suitable modifications come within the scope of the present invention, as brought out in the numbered paragraphs hereafter.

First, any suitable fastening means may be used, if desired, in place of screws 24.

Second, although the preferred form illustrated in FIG. 4 has hole 122k larger than fastener head 24a, it should be readily apparent that leg 122a will have substantial support against downward deflection by the supporting action of retainer clip 123 if cross bar 123a is located in direct contact with the lower surface of leg 122a in FIG. 4 and if hole 122k should be slightly larger than shank 24b but smaller than head 24a so that head 24a is located wholly on the upper surface of leg 122a. Then, retainer clip 123 would form a bracing or strengthening element under leg 122a.

Third, although C-shaped channel member 122 is secured to base surface 21b, it should be readily apparent that the present invention includes any other non-buckling construction using retainer clip 123, or a suitable modified form thereof. For example, member 122 may have any generally channel shaped cross section, may have a recess 122j therein extending inwardly from an opening 122b in one wall of member 122, may have a recess 122j having a first surface having recess portions 122f and 122g straddling opening 122b and having a second surface on leg 122a on the opposite side of recess 122j, may be at least partially tubular in cross section with an opening 122b in one wall thereof forming channel 122j and being adapted to be pulled against a surface 21b, or may be box-shaped in cross section. Also, such retainer clip construction may be used to secure not only a movable glass stop member 122 but any such shaped member to a base surface.

Although the description in the preceding paragraphs of the component parts, structure, mode of operation and advantages has been given only of the structure in the first form of the invention in FIGS. 4 and 5, it will be apparent hereafter that the same description applies generically to the correspondingly named component parts in the second form of the invention in FIG. 6 having the same reference numerals, except in the 200 series, and intended to be used in the assembly in FIGS. 1 and 2.

The structural differences between these two different invention forms will also be brought out hereafter.

FIG. 6 shows movable glass stop 222 having legs 222a, 222c, 222d, 222f, and 222g; surfaces 222f1, 222f2, 222g1 and 222g2; open side 222b; channel 222j; and hole 222k. FIG. 6 also shows retainer clip 223 having legs 223b and 223c, base or cross bar 223a, elongated hole 223k, and retainer portions 223b1 and 223c1.

In FIGS. 4 and 5, locating means are provided for locating clip 123 along the axis of channel 122j so that holes 122k and 123k will align. Here the specific locating means is shown as a struck out projection 122p on leg 122c coacting with and located in hole 123h in retainer clip legs 123b so as to locate clip 123 along the axis of channel 122j. This projection 122p is located in leg 122c closest to glass pane unit 24 so as to be normally hidden from view in the assembled position shown in FIG. 2.

In FIG. 4, fifth leg 122g is planar throughout its length and extends throughout its length parallel to third leg 122a.

In FIG. 6, fifth leg 222g is bent into hook-form extending back toward third leg 222a. Retainer clip 223 is of different shape than retainer clip 123. Top surface of retainer clip 223, contiguous to hole 223k therein, is depressed for a zone at least as great as the shape of fastener head 24a to form depression 223d so that fastener head 24a is countersunk in third leg 222a with the plane of head 24a on the lower or shank side thereof being located below the plane of third leg 222a. This construction is especially desirable when fastener head 24a has a long axial length and countersinking of the head will improve the appearance of the construction.

The invention may be embodied in other specific forms without departing from the spirit or essential characteristics thereof. The present embodiments are therefore to be considered in all respects as illustrative and not restrictive with the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. A door or window construction, comprising:
   (a) a sheet member forming a channel, being at least generally C-shaped in cross section, and adapted to have the open side of the C-shape pulled against a base surface,
   (b) said member including in cross section:
       (1) first and second legs connected respectively to opposite ends of a third leg, and
       (2) fourth and fifth legs connected respectively to said first and second legs remote from said third leg with each fourth and fifth leg having a surface bearing against said base surface,
   (c) a retainer clip of generally inverted U-shape with the distal ends of the legs of said U-shape respectively bearing against the surfaces of said fourth and fifth legs remote from said base surface,
   (d) said third leg and the cross bar of the U-shaped retainer clip having aligned holes, and (e) a headed fastener extending through said holes, having its shank extending through the hole in said clip, and secured in said base surface with the head of said fastener contiguous to said third leg, (f) whereby driving of said fastener will secure said member against said base surface by having the fourth and fifth legs pushed against said base surface by the distal ends of the retainer clip so that the head of the said fastener does not inwardly bow said third leg by the securement force, (g) a framing element for an opening adapted to contain glass, (h) said element having said base surface, having a fixed glass window stop contiguous to one edge of said base surface, and being located along at least one side of said opening, (i) said member comprising a movable glass stop for said element, and (j) a glass pane unit positioned between said movable glass stop and said fixed glass stop, (k) said construction being assembled by the shank end of said fastener being inserted sequentially through the holes in said third leg and said cross bar into said base surface, (l) the head of said fastener being located within the opening framing said glass pane unit and located in the plane of the third leg of said member and substantially filling the hole in said third leg, (m) the outer surface of said third leg being substantially planar so that if it is highly polished, light reflection will be generally uniform over the whole of such surface of said third leg and containing the head of said fastener to give the appearance that the head of said fastener directly secures said third leg.

2. An assembly, comprising:
(a) a sheet member forming a channel, being at least generally C-shaped in cross section, and adapted to have the open side of the C-shape pulled against a base surface, (b) said member including in cross section:
  (1) first and second legs connected respectively to opposite ends of a third leg, and
  (2) fourth and fifth legs connected respectively to said first and second legs remote from said third leg with each fourth and fifth leg having a surface bearing against said base surface,
(c) a retainer clip of generally inverted U-shape with the distal ends of the legs of said U-shape respectively bearing against the surfaces of said fourth and fifth legs remote from said base surface,
(d) said third leg and the cross bar of the U-shaped retainer clip having aligned holes, and
(e) a headed fastener extending through said holes, having its shank extending through the hole in said clip, and secured in said base surface with the head of said fastener contiguous to said third leg,
(f) whereby driving of said fastener will secure said member against said base surface by having the fourth and fifth legs pushed against said base surface by the distal ends of the retainer clip so that the head of the said fastener does not inwardly bow said third leg by the securement force,
(g) said hole in said third leg having a cross sectional area greater than the head of said fastener,
(h) the head of said fastener being located in the plane of said third leg,
(i) whereby the full fastening force exerted by the head of said fastener is carried by said retainer clip instead of by said third leg.

3. An assembly, as set forth in claim 2, with:
(a) one of the legs in said member having locating means thereon coacting with said retainer clip to locate said clip along the axis of the channel.

References Cited in the file of this patent
UNITED STATES PATENTS

| | | |
|---|---|---|
| 1,012,190 | Clark | Dec. 19, 1911 |
| 1,065,507 | Cook et al. | June 24, 1913 |
| 1,273,309 | Arbter | July 23, 1918 |
| 1,351,058 | Murnane | Aug. 31, 1920 |
| 2,800,983 | Toney | July 30, 1957 |